United States Patent [19]

Vella-Coleiro

[11] Patent Number: 5,278,690
[45] Date of Patent: Jan. 11, 1994

[54] APPARATUS AND METHOD FOR SYNCHRONIZING A PLURALITY OF REMOTE TRANSMISSION AND RECEIVING STATIONS AND PROVIDING AUTOMATIC GAIN CONTROL OF THE SYNCHRONIZING SIGNAL

[76] Inventor: George P. Vella-Coleiro, 54 New England Ave., #6, Summit, N.J. 07901

[21] Appl. No.: 900,766

[22] Filed: Jun. 19, 1992

Related U.S. Application Data

[63] Continuation-in-part of Ser. No. 700,963, May 16, 1991, abandoned.

[51] Int. Cl.[5] .................... H04B 10/08; H04B 10/00; H04B 10/12
[52] U.S. Cl. .................... 359/152; 359/110; 359/158; 359/173; 379/379; 379/59; 455/33.1
[58] Field of Search ............... 359/125, 143, 144, 167, 359/172, 173, 145, 152, 113, 114, 153; 455/51, 70, 71, 69, 88, 33.1, 53.1, 54.1, 67.4; 379/379, 56, 58, 59

[56] References Cited

U.S. PATENT DOCUMENTS 3,824,470 7/1974 Eastmond .................... 455/42
5,046,124 9/1991 Wu et al. .................... 455/20
5,067,173 11/1991 Gordon et al. .................... 359/152

FOREIGN PATENT DOCUMENTS 54-51934 10/1980 Japan .................... H04B 9/00

Primary Examiner—Richard E. Chilcot, Jr.
Assistant Examiner—Rafael Bacares

[57] ABSTRACT

System synchronization is achieved in a system of remote stations serving a particular cell site or base station by combining rf signals transmitted to the base station from the cell site with a reference signal to form a composite signal. This composite signal is used to modulate the output of a base station laser transmitter. The composite signal is transmitted to the remote station where the reference frequency is extracted and used to synchronize the rf circuits of the remote station. Special diagnostic features are built into the remote station transceivers so that equipment functioning may be monitored at the base station.

3 Claims, 5 Drawing Sheets

APPARATUS AND METHOD FOR SYNCHRONIZING A PLURALITY OF REMOTE TRANSMISSION AND RECEIVING STATIONS AND PROVIDING AUTOMATIC GAIN CONTROL OF THE SYNCHRONIZING SIGNAL

This application is a continuation-in-part of application Ser. No. 07/700,963 filed May 16, 1991 now abandoned.

FIELD OF THE INVENTION

This invention relates to wireless and/or cellular radiotelephone communication systems and the use of remote transceiver stations in improving signal radiation and reception over a geographical area nominally covered by a single central base station or cell site.

BACKGROUND OF THE INVENTION

Increasing the capacity and improving cell radiation in a wireless and/or cellular radiotelephone system has traditionally required a splitting of the cell in which a new pattern of a greater number of smaller cells replaces the previously existing cell pattern. This arrangement requires the creation of many new cell sites which in turn requires the acquisition of real estate to locate the new cell sites and the replication of expensive cell site radio and switching equipment.

The need for new cell sites may be avoided by the use of remote transceiver stations all connected to an existing cell site or base station and distributed through out the existing cell. These remote transceiver stations function as 'repeaters' or 'radiators' in interconnecting mobile units and the cell sites or base stations. These remote stations handle rf signals sent to and from mobile radiotelephone units which they retransmit for communication with the base stations via fiber optics or other transmission media. In order to optimize the operation of the system it is necessary to provide system synchronization for the multiplicity of rf circuits of the remote stations.

SUMMARY OF THE INVENTION

System synchronization is achieved in a system of remote transceiver stations serving a particular cell site or base station by combining rf signals transmitted to the remote station from the cell site with a reference signal, obtained from a highly stable reference signal source, to form a composite signal. In an illustrative embodiment this composite signal is used to modulate the output of a base station laser transmitter. The composite signal is transmitted to the remote station where the reference frequency is extracted and used to synchronize the rf circuits of the remote station. Special diagnostic features of the remote station transceivers are synchronized by the synchronizing signal so that proper transceiver equipment functioning may be monitored at the base station.

DETAILED DESCRIPTION

Figure 1:
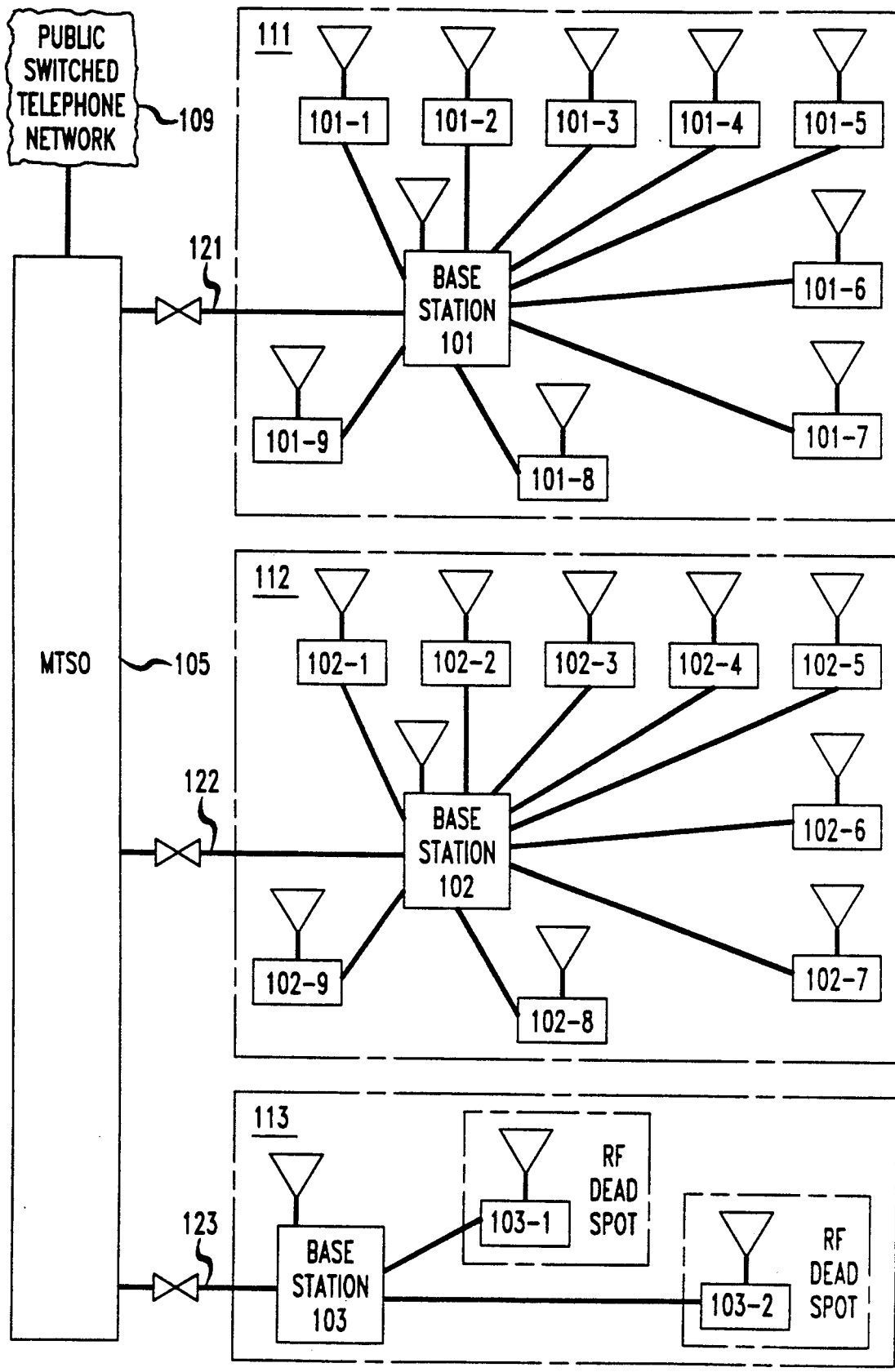
FIG. 1 is a system schematic of a plurality of cellular radiotelephone cells each with a system of remote transceiver stations.

A cellular radiotelephone system utilizing a plurality of remote transmitting and receiving stations within cells of the cellular system is shown in FIG. 1. A plurality of base stations 101, 102 and 103, each servicing a particular cell (i.e. geographical area) 111, 112 and 113 are shown connected to a common mobile telephone switching center 105, via the trunks 121, 122 and 123. The mobile telephone switching center 105 connects the base stations through switching circuitry to the public switched telephone network 109. It therefore interconnects the individual mobiles in the cells to a public switched telephone network 109.

Each cell 111, 112 and 113 includes a plurality of remote transmitting and receiving stations 101-1 through 103-2. The remote stations 101-1 through 101-9 of cell 111 may be added to serve increased traffic or to improve radiation and reception in selected cell areas. In cell 113 two remote stations 103-1 and 103-2 are included to serve what would otherwise be RF dead-spots in the cell. Cell 112 may include the added remote stations 102-1 to 102-10 for a variety of these purposes.

Figure 2:
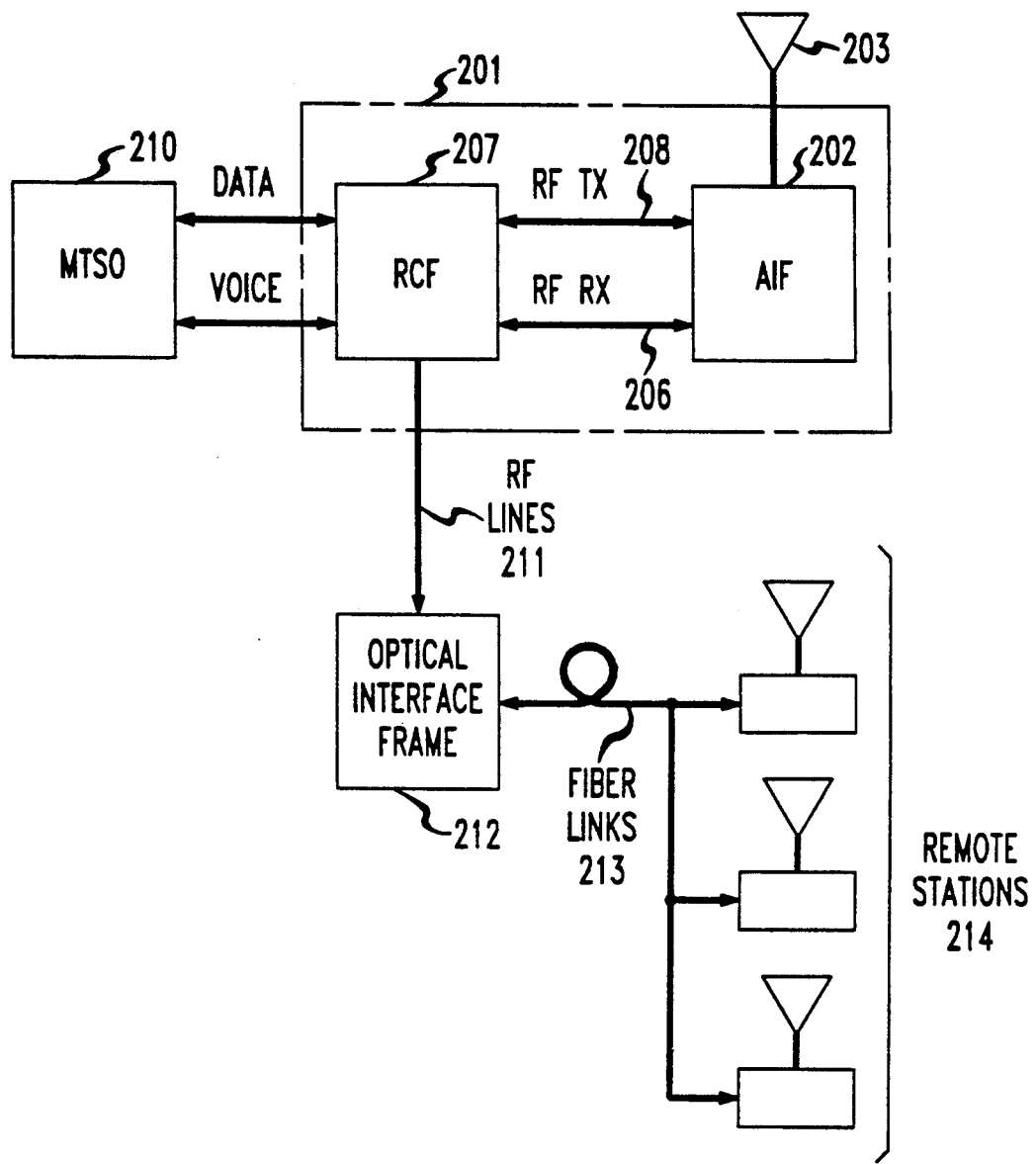
FIG. 2 is a block schematic of a base station including the optical transmission links to the remote transceiver stations.

A detailed block diagram of the base station to remote station connections is shown in FIG. 2. The base station 201 includes an air interface frame 202 connected to an antenna 203. The air interface frame 202 which includes rf filter and amplifier circuits, is connected to the antenna 203 to transmit radiotelephone signals. It is also connected to the receive line 206 coupling it to a radio channel frame 207 which includes the radio transceivers dedicated to each of the individual channels. A transmit line 208 connects the radio channel frame 207 to the air interface frame 202. The radio channel frame 207 is connected, via voice and data trunks, to the mobile telephone switching office 210.

Figure 3:
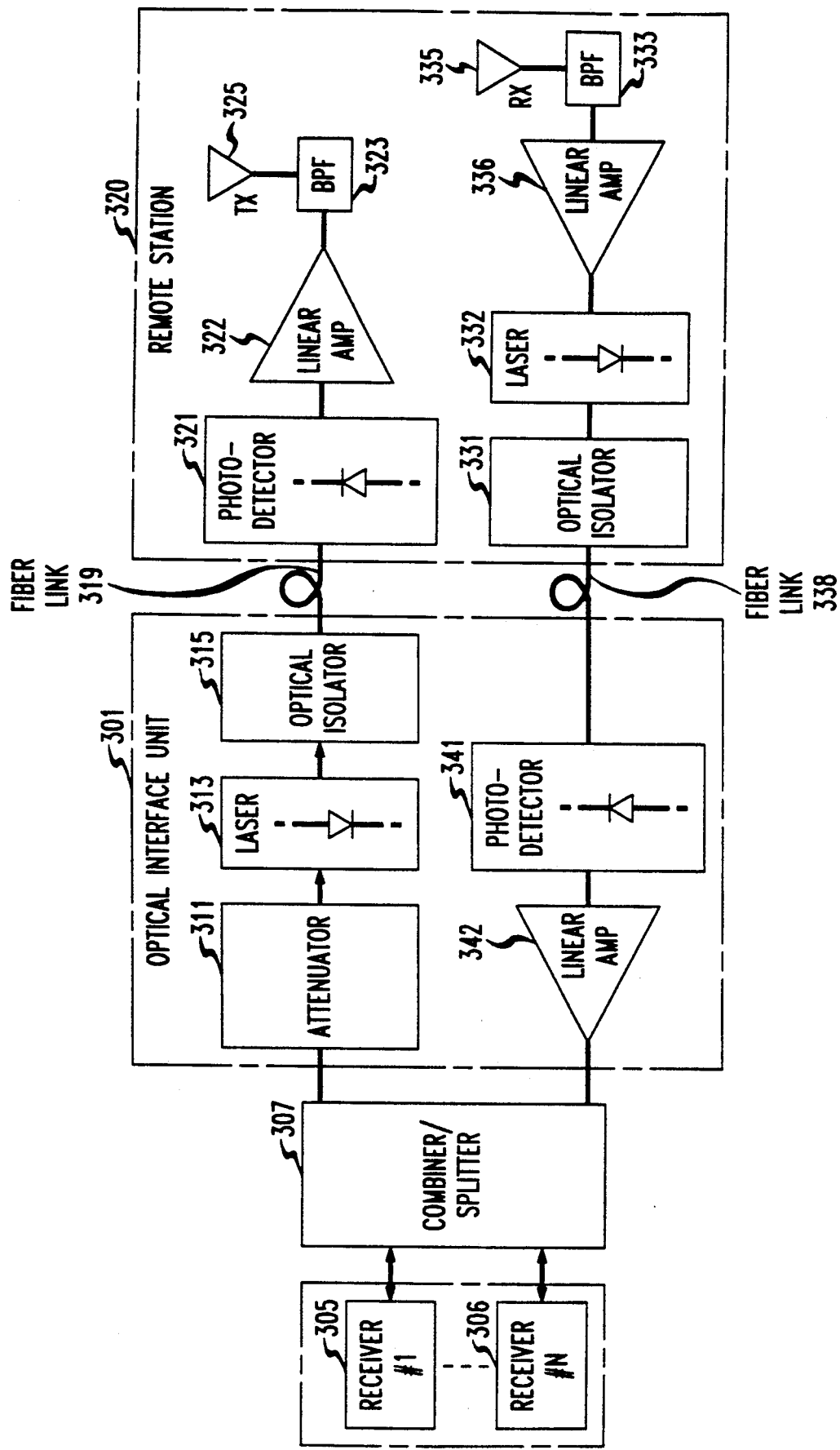
FIG. 3 is a block schematic of the optical interface circuits at the base station and the remote transceiver stations.

An RF transmission link 211 connects the radio channel frame 207 to an optical interface frame 212 which is connected to optical fiber transmission links 213 coupling it to a plurality of remote transceiver station 214 located within the cell. The fiber optic transmission and reception circuitry is shown in FIG. 3 and includes an optical transceiver unit 301 included at the base station. Optical transceiver unit 301 is connected to the radio channel units 305, via the rf combiner/splitter 307. The input signals supplied from the radio channel units 305 proceed through an attenuator 311 which applies the radio signal to a laser transmitter 313. The output of the laser transmitter 313 is applied through an optical isolator 315 to an optical fiber link 319 coupling it to the remote transceiver station 320. The optical fiber link 319 is connected to a photo detector 321 at the remote transceiver station 320 which recovers the rf signal from the light signal and applies the detected signal to a linear amplifier 322. The received amplified rf signal is coupled through a band pass filter 323 to a transmitting antenna 325.

Signals (rf) received at the receiving antenna 335 at the remote transceiver station 320 are coupled via a band pass filter 333 to the linear amplifier 336. The amplified rf signals are applied to the laser transmitter 332 and applied, via an optical isolator 331, to the fiber link 338 connecting the remote station 320 to the base station. The light signal, received at the base station, is applied to a photo detector 341 and an rf signal is recovered. This signal is connected, via linear amplifier 342 and combiner/splitter 307, to the radio channel units 305.

Figure 4:
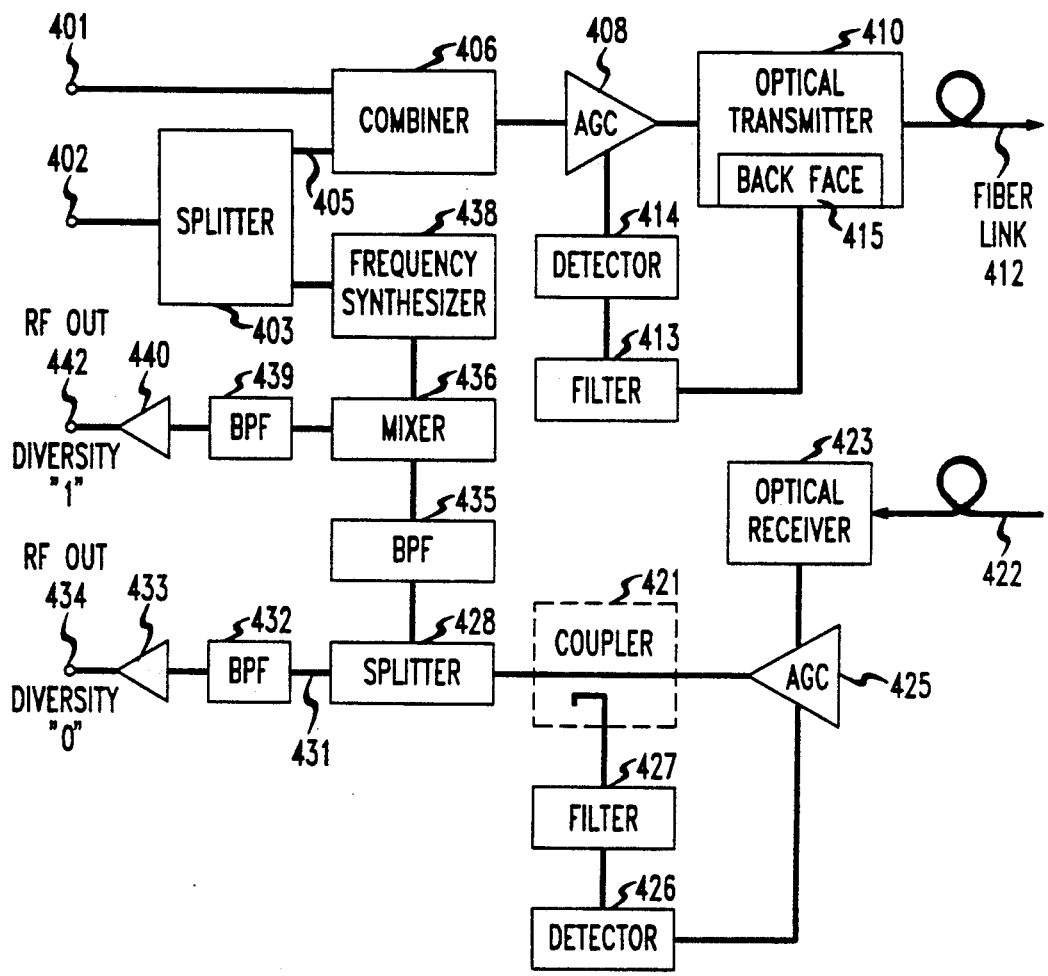
FIG. 4 is a schematic of transceiver circuitry included at a base station for communicating with a remote transceiver station.

A detailed schematic of the optical transceiver unit included at the base station is shown in FIG. 4. Rf signals from the radio channel units of the base station are applied to the input lead 401. A reference frequency signal is applied to the lead 402. Lead 402 is connected to the splitter 403 which splits the reference frequency signal into two paths. One path 405 is connected to the combiner 406. Here the reference frequency signal is combined with the rf signals from the radio channel units, supplied on lead 401. This combined or composite signal is transmitted, via the automatic gain control amplifier 408 to the optical transmitter 410. The optical transmitter converts the composite rf signal to a composite light signal and applies this composite light signal to the optical fiber link 412 which transmits the composite light signal to the remote stations. The optical transmitter includes a back face monitor 415 which includes a photo detector to measure light intensity. A feedback loop including a filter 413 tuned to the reference frequency and a detector 414 feeds signals from the optical transmitter's back-face monitor 415 to the agc amplifier 408 in order to maintain the proper laser modulation level.

Signals received from the remote transceiver stations are coupled by the optical fiber link 422 to an optical receiver 423 which converts the composite light signal to a composite rf signal. This composite rf signal comprising a combined rf reference frequency signal and an rf signal is applied to the agc amplifier 425. A parallel loop path including a detector circuit 426 and a filter 427 tuned to the reference frequency connects an amplitude control of the agc amplifier 425 to a coupler 421 which samples the agc amplifier output level. The output of the agc amplifier 425 is applied to the splitter 428 which divides the signal into two paths. One path on lead 431 is applied to the band pass filter 432. The signal passed by the bandpass filter 432 is applied to the output amplifier 433 of the rf diversity "0" output on lead 434.

A second output of the splitter 428 is applied to the bandpass filter 435, tuned to the rf signal frequency band, whose output is in turn applied to the mixer 436. The other input to mixer 436 is supplied by the frequency synthesizer 438 responsive to the reference frequency signal output of the splitter 403. The output of mixer 436 is a signal having the sum and difference frequencies of these two signals. The sum frequency signal is passed by the bandpass filter 439. It's output is applied to the amplifier 440 to provide the rf diversity "1" output on lead 442.

Figure 5:
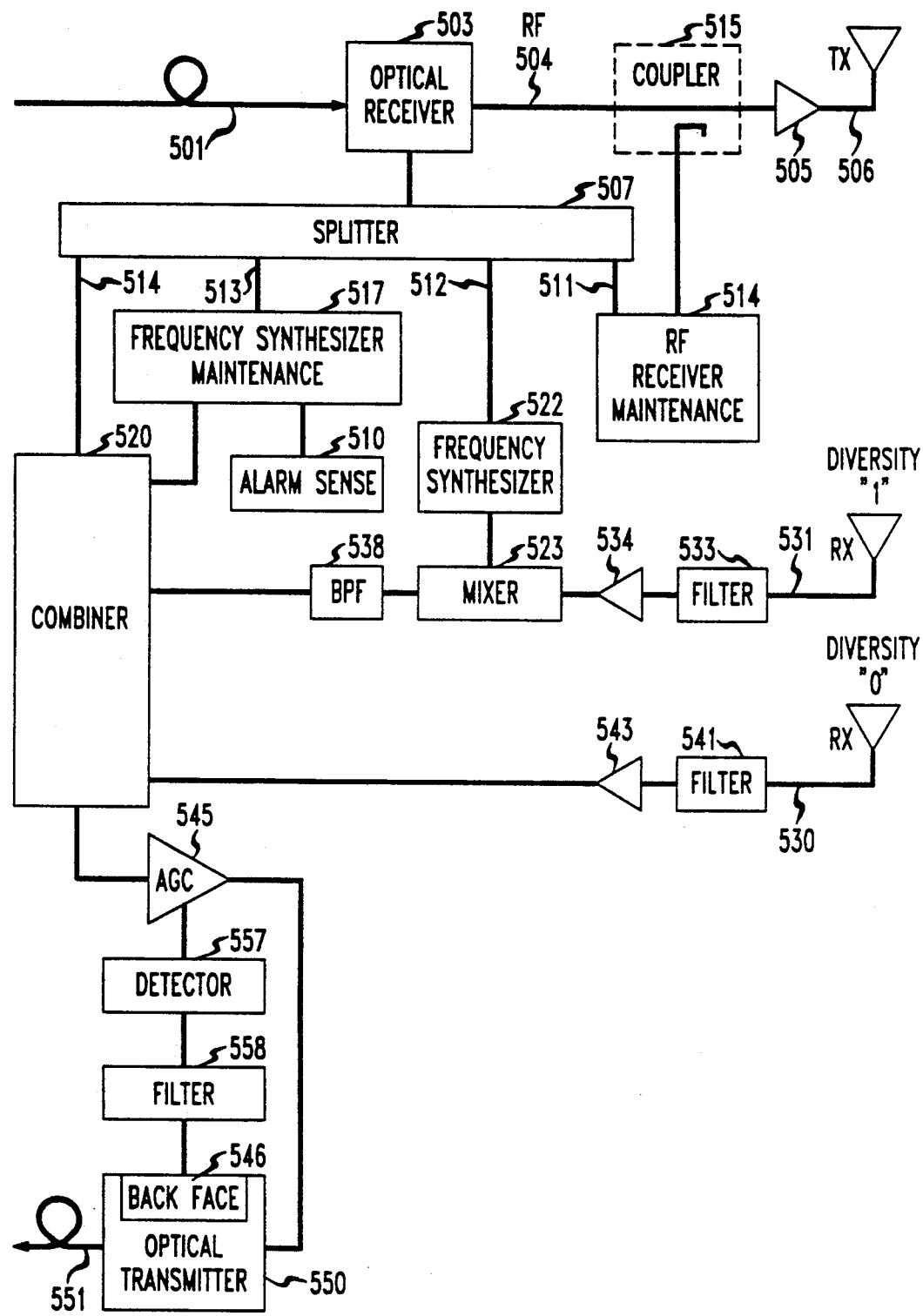
FIG. 5 is a schematic of transceiver circuitry included in the remote transceiver station.

The details of the optical transceiver unit at the remote station are shown in the FIG. 5. An optical fiber link 501 is connected to an optical receiver 503. The optical receiver 503 recovers the rf signal and the reference frequency signal. An rf signal output of the optical receiver 503 is connected, via lead 504, to the amplifier 505 which is connected in turn, via lead 506, to the transmitting antenna. The reference frequency signal output of the optical receiver 503 is applied to a four way splitter 507. One output on lead 511 is applied to an rf receiver 514 operative for demodulating maintenance messages received from the base station. It is connected to the coupler 515. A second output on lead 513 is connected to a frequency synthesizer 517 for supplying signals to be used as a carrier for maintenance data generated at the remote transceiver station which is to be transmitted to the base station. An output of frequency synthesizer 517 is connected to an alarm sensor 510 which senses alarm conditions at the remote station. The output of frequency synthesizer 517 is also directly applied to the combiner circuit 520. The signal output of frequency synthesizer 517 includes alarm information which is transmitted to the base station. The third output of splitter 507 on lead 512 is applied to a local oscillator frequency synthesizer 522 whose controlled frequency signal output is in turn applied to a mixer 523. The fourth output on lead 514 is applied to the combiner circuit 520 and is combined with the rf signal for modulation control of the optical transmitter 550.

Received signals are received at the diversity "0" and diversity "1" receiving antennas on leads 530 and 531, respectively. The diversity "1" signal on lead 531 is applied to a filter 533, and coupled, via amplifier 534, to the mixer 523. The mixer 523 combines the diversity "1" signal with the output of local oscillator frequency synthesizer 522 and applies the resultant difference signal to the bandpass filter 538 tuned to pass the difference signal. The output of the bandpass filter 538 is applied to the combiner circuit 520.

The received diversity "0" signal is applied to the filter 541 and the filtered output is coupled by an amplifier 543 to the combiner circuit 520. The output of combiner circuit 520 is applied to the automatic gain control amplifier 545 whose output is in turn applied to an optical transmitter 550 connected by the optical fiber link 551 to the base station. A parallel connecting loop including detector 557 and filter 558 also connects the level control of the agc amplifier 545 to the back face monitor 546 of the optical transmitter 550.

I claim:

1. In a cellular radiotelephone system, apparatus for synchronizing a plurality of remote transceiver stations and a base station connected to the remote stations to a common reference signal having a reference frequency; comprising;

the base station including;
a first input for receiving an RF radio signal,
a second input for receiving a reference signal,
a base station splitter connected to the second input for splitting the reference signals into first and second base paths,
a base signal combiner circuit connected to the first input and the first base path and operative for combining the RF radio signal and the reference signal into a first RF composite signal,
a laser device connected to the base signal combiner circuit and operative for converting the first RF composite signal into an AM composite light signal,
a transmitting light fiber link having a first end connected to the laser device,
a remote transceiver station connected to a second end of the light fiber link to receive the AM composite light signal of the laser device and including;
an optical signal received connected to the light fiber link and operative for separating the reference signal from the AM composite light signal for synchronizing operations in the remote station;

a remote station splitter connected to the optical signal receiver and operative for splitting the reference signal into first, second and third remote paths, RF signal transmission apparatus connected to the optical signal receiver and operative for providing radio signal transmission of RF signal outputs of the optical signal receiver, a first frequency synthesizer connected to the first remote path to accept the reference signal separated from the AM composite light signal and generate a RF carrier signal at a cellular frequency to be modulated by a maintenance signal returned to the base station to indicate status of the remote station, RF signal reception apparatus in the remote transceiver station for receiving cellular telephone radio signals and including a mixer, a second frequency synthesizer connected to the second remote path to accept the reference signal separated from the AM composite light signal and generate a local oscillator signal applied to the mixer for down converting received RF radio signals;

an RF maintenance receiver connected to the third remote path to accept the reference signal separated from the AM composite light signal and generate a signal frequency to tune the RF maintenance receiver to a control signal frequency generated by the base station for maintaining the remote station;

a remote signal combiner circuit coupled to the RF signal reception apparatus and the first and second remote paths whereby the remote signal combiner circuit generates a return RF composite signal.

a remote optical transmitter connected to the remote signal combiner circuit and operative for converting an output of the remote signal combiner to an AM return optical signal, a second transmitting light fiber interconnecting the remote optical transmitter to the base station, a base optical receiver at the base station connected to the second transmitting light fiber and connected to receiver circuitry at the base station for separating the RF signals from the AM return optical signal, the receiver connected to receive the reference signal from the second base path, and including an AGC amplifier responsive to an amplitude of the reference signal to adjust an amplitude of the RF signal to compensate for optical losses in the second transmitting light fiber.

2. In a cellular radiotelephone system, apparatus for synchronizing a plurality of remote transceiver stations and a base station connected to the remote stations to a common reference signal having a reference frequency; as claimed in claim 1;
 comprising:
  maintenance monitoring circuitry at the remote station connected to receive intelligence signals and to the second remote path to receive the second reference signal.

3. In a cellular telephone system, a method for synchronizing a plurality of remote transceiver stations and a base station connected to the remote stations to a common reference signal having a reference frequency; comprising the steps of:
 at the base station, receiving a RF radio signal, and receiving a reference signal, and splitting the reference signal into first and second base signal paths;
 combining the RF radio signal and the reference signal from the first base signal path into a first RF composite signal, and converting it into an AM composite light signal;
 transmitting the AM composite light signal to the remote transceiver station via a light fiber link;
 receiving the AM composite light signal transmitted on the light fiber link at the remote transceiver station and separating the received reference signal from the AM composite light signal into first, second and third remote paths,
 receiving RF signals at the remote transceiver station;
 utilizing the received reference signal in the first remote path to generate a RF carrier signal at a cellular frequency and modulating the RF carrier signal with maintenance alarm signals at a first frequency synthesizer to generate a return RF composite signal returned to the base station to indicate status of the remote station;
 converting the return RF composite signal into an AM return composite light signal, and transmitting the AM return composite light signal via a second light fiber link to the base station;
 at the base station receiving the AM return composite light signal and separating the RF signals and adding a reference signal from the second base signal path;
 utilizing the received reference signal in the second remote path to generate a local oscillatory signal applied to a mixer for down converting received RF radio signals;
 utilizing the received reference signal in the third remote path for use by an RF maintenance receiver to tune to a signal frequency generated by the base station for monitoring the remote station; and
 controlling a gain of the received RF signal in response to an amplitude of the reference signal to compensate for amplitude variations in the second light fiber link.

* * * * *